United States Patent [19]

Downs

[11] Patent Number: 4,664,242

[45] Date of Patent: May 12, 1987

[54] TORQUE TRANSMITTING DEVICE HAVING A FLUID-OPERATED PISTON

[75] Inventor: Robert C. Downs, Ortonville, Mich.

[73] Assignee: General Motors Corporation, Detroit, Mich.

[21] Appl. No.: 782,033

[22] Filed: Sep. 30, 1985

[51] Int. Cl.⁴ .............................................. F16D 3/14
[52] U.S. Cl. ............................. 192/106 F; 192/70.21; 192/70.28; 192/85 AA
[58] Field of Search ............ 192/70.21, 70.28, 85 AA, 192/85 A, 106 F

[56] References Cited

U.S. PATENT DOCUMENTS

| | | | |
|---|---|---|---|
| 3,262,531 | 7/1966 | Black et al. | 192/85 AA |
| 3,612,237 | 10/1971 | Honda | 192/85 AA |
| 3,690,429 | 9/1972 | Honda | 192/85 AA |
| 4,271,951 | 6/1981 | Nishimura et al. | 192/106 F |

FOREIGN PATENT DOCUMENTS 613011 11/1960 Italy ............................... 192/85 AA Primary Examiner—Cornelius J. Husar
Assistant Examiner—Joseph A. Fischetti
Attorney, Agent, or Firm—Donald F. Scherer

[57] ABSTRACT

A multi-plate friction torque transmitting device has a plurality of friction plates which are controlled between engaged and disengaged conditions by a fluid-operated piston. The piston is comprised of an apply piston portion and a take-up piston portion. The take-up piston portion responds rapidly when pressurized to remove the disengaged clearance between the friction plates and initiates the engagement condition. The apply piston is operable to provide the high forces necessary for a complete engagement. These high forces are transmitted through a fluid medium disposed between the apply piston and the take-up piston. A centrifugal mechanism is operable on the take-up piston to counteract the centrifugal forces applied thereto during the disengaged condition.

3 Claims, 3 Drawing Figures

TORQUE TRANSMITTING DEVICE HAVING A FLUID-OPERATED PISTON

BACKGROUND OF THE INVENTION

This invention relates to torque transmitting devices and more particularly to such devices having fluid-operated pistons.

Prior art torque transmitting devices, such as clutches and brakes, generally provide a single piston which cooperates with a step diameter cylinder to establish separate operating annuli. One area of the piston is pressurized at initiation of engagement to provide take-up or clearance removal between the friction plates of the clutch or brake. The other piston area is fed generally through an orifice so that the total piston area is pressurized for complete clutch engagement. In these prior art devices, the entire operating piston must move against the return spring to achieve clearance removal. The time required to fill the cylinder and establish the pressure to achieve this piston movement can vary considerably from device to device and also can extend over a time period of 100 milliseconds or longer.

SUMMARY OF THE INVENTION

The present invention provides a fluid-operated split or two-piece piston constructed such that only a small portion of the piston is moved to achieve take-up or clearance removal thus substantially reducing the time required for initial engagement. Also, this piston does not operate against the return spring. Final engagement is achieved by pressurizing a large area which is connected by a fluid medium to the small area such that the large forces required for complete engagement can be transmitted with very slight movement of the large piston. This structure substantially reduces the time required for clutch fill and complete clutch engagement.

The time required to provide complete engagement with the present invention has been found to vary from approximately 40 milliseconds at 300 kPa line pressure to approximately 20 milliseconds at 700 kPa of line pressure. These times compare to approximately 255 milliseconds and 110 milliseconds, respectively, for a conventional clutch using a single chamber fill.

It is therefore an object of this invention to provide an improved fluid-operated piston for a multi-plate friction torque transmitting device wherein an apply piston is slidably disposed in a fluid cylinder and a take-up piston is slidably disposed in the apply piston such that initial pressurization causes the take-up piston to urge the friction plates into abutment and further pressure increase causes full engagement of the torque transmitting device.

It is another object of this invention to provide an improved fluid-operated piston for a multiplate torque transmitting device wherein the piston has an apply piston with a take-up piston slidably disposed therein and in fluid communication therewith through a one-way valve such that initial pressurization will cause the take-up piston to move relative to the apply piston to thereby remove the clearance in a torque transmitting device and increased pressure on the apply piston will be transmitted to the take-up piston with only slight movement to provide an engagement force and wherein the one-way valve prevents return flow of fluid from the take-up piston such that only slight movement of the apply piston is needed to establish complete clutch engagement.

It is a further object of this invention to provide an improved fluid-operated piston for a fluid-operated multi-plate friction torque transmitting device wherein the piston is comprised of an apply piston and a take-up piston slidably disposed therein and communicating therewith through a one-way valve such that initial pressurization of the torque transmitting device urges the take-up piston to move relative to the apply piston to remove the clearance space in the device and further pressurization and slight movement of the apply piston results in closing of the one-way valve and increased pressure in the fluid trapped by the one-way valve so that the apply force of the apply piston is transmitted to the torque transmitting device through the take-up piston.

It is a still further object of this invention to provide an improved fluid-operated piston for a friction torque transmitting device including an apply piston portion and a take-up piston portion with a trapped fluid chamber and a one-way valve disposed between the piston portions and the device further includes a centrifugal mechanism for counteracting the centrifugal pressure head developed on the take-up piston by rotation of the torque transmitting device.

DESCRIPTION OF THE DRAWINGS

These and other objects and advantages of the present invention will become more apparent from the following description and drawings in which.

Figure 1:
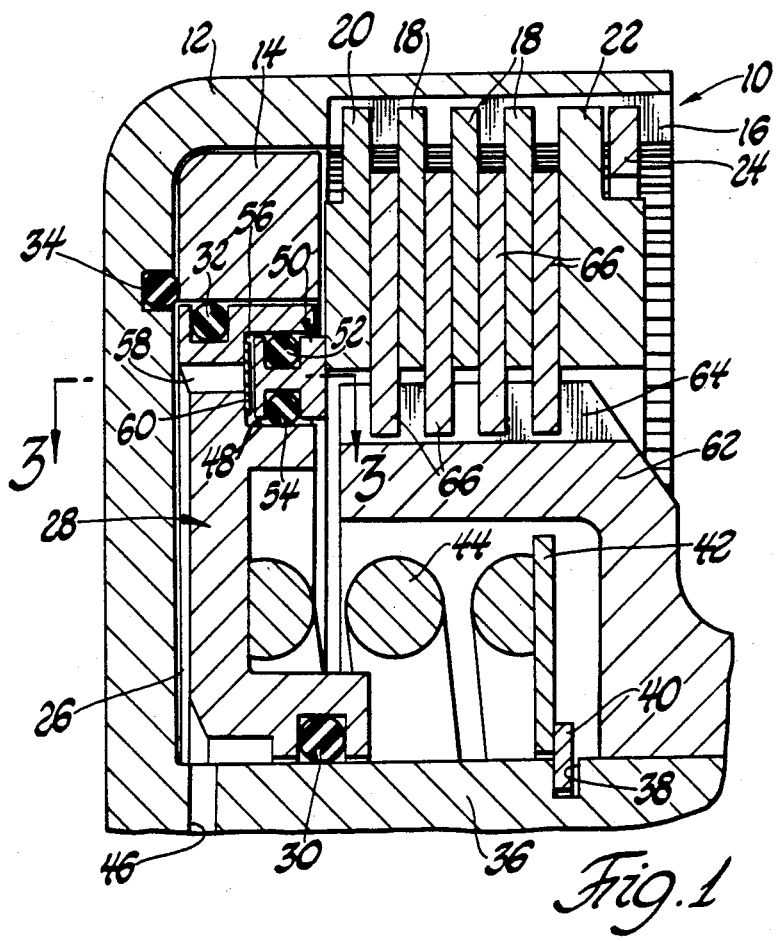
FIG. 1 is a partial sectional elevational view showing a portion of a torque transmitting device and an apply piston mechanism.
Figure 3:
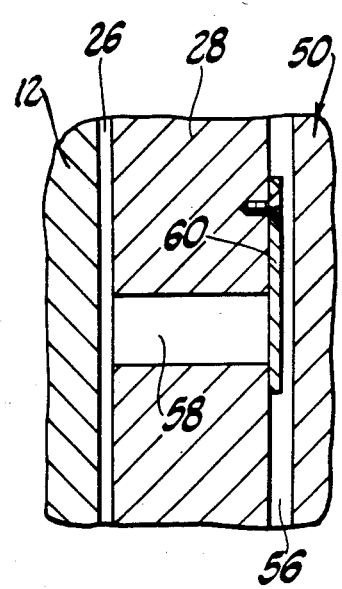
FIG. 3 is a sectional view taken along line 3—3 of FIG. 1.
Figure 2:
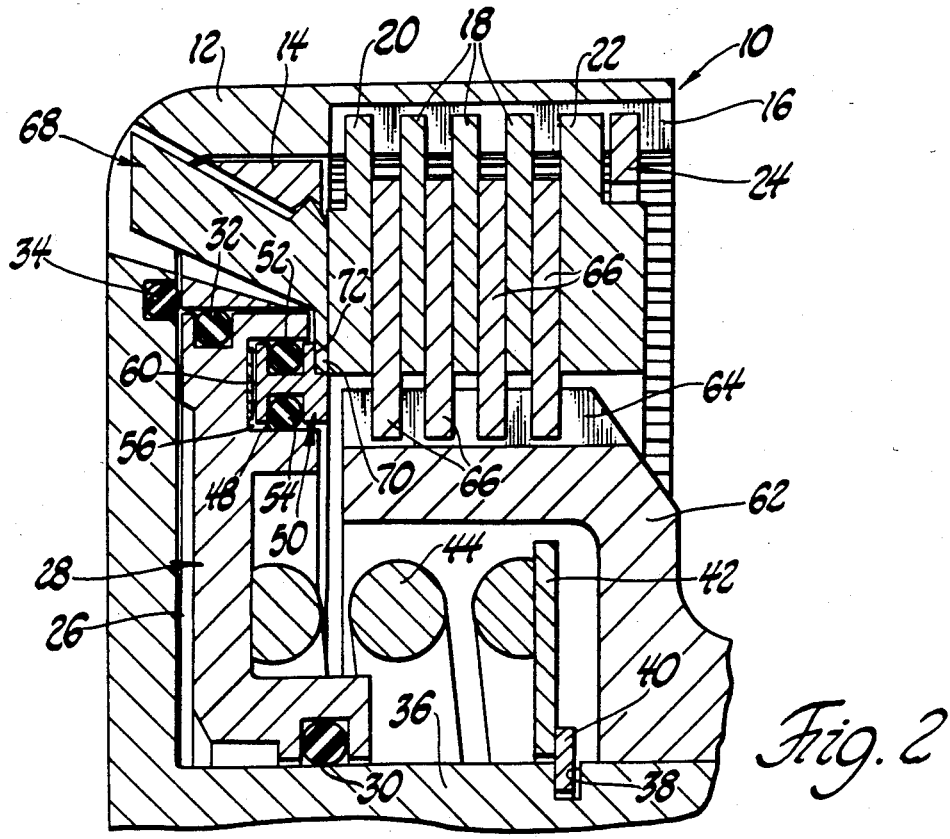
FIG. 2 is a sectional elevational view similar to FIG. 1 taken through a different portion of the torque transmitting device.

Referring to the drawings, wherein like characters represent the same or corresponding parts throughout the several views, there is seen a fluid-operated torque transmitting assembly 10, hereinafter referred to as a clutch. The clutch 10 includes an annular clutch housing 12 in which is disposed an annular filler or ring member 14. The annular housing 12 has a spline portion 16 which is engaged by a plurality of toothed friction plate members 18, a pressure plate 20 and a back-up plate 22. Axial movement of the plates 18, 20 and 22 is limited in the rightward direction by a lock ring or snap ring 24.

The filler ring 14 and clutch housing 12 cooperate to provide a piston chamber 26 in which is slidably disposed an annular apply piston 28. The apply piston 28 has an inner annular O-ring seal 30 and an outer annular O-ring seal 32 which cooperate with clutch housing 12 and filler ring 14 to provide fluid tightness for the chamber 26. An annular O-ring seal 34 ensures against fluid leakage between the filler ring 14 and the clutch housing 12. The clutch housing 12 has an inner cylindrical portion 36 in which is formed a groove 38 for housing a snap ring 40. The snap ring 40 positions a retainer ring 42 which is abutted by a piston return spring 44 trapped between the retainer 42 and the apply piston 28. The spring 44 urges the apply piston 28 leftward away from the pressure plate 20.

The cylindrical portion 36 has formed therein a fluid passage 46 which communicates with the chamber 26.

This permits fluid to be delivered to and exhausted from chamber 26. The control of fluid to and from chamber 26 can be provided by any of the well-known clutch or brake control mechanisms currently utilized in automatic transmissions. In the alternative, a simple manually operated on/off valve can provide the control function, if desired.

The apply piston 28 has formed therein an annular recess 48 in which is slidably disposed a take-up piston 50. The take-up piston 50 has a pair of annular seals 52 and 54 which cooperate with the recess 48 to provide a substantially fluid tight chamber 56. The chamber 56 is in fluid communication with the chamber 26 through a passage 58 and a one-way reed valve 60. The one-way valve 60 permits fluid flow from chamber 26 to chamber 56 but prevents fluid flow in the opposite direction.

The clutch 10 also includes a hub 62 which has a spline portion 64. A plurality of friction toothed plates 66 are engaged with the spline 64 and interleaved with the plates 18, 20 and 22. As is well-known in friction torque transmitting devices, when the friction plates 66 are forced into frictional abutment or engagement with the plates 18, 20 and 22, torque can be transmitted between the housing 12 and the hub 62.

The plates 18, 20, 22 and 66 are urged into and maintained in frictional engagement by the presence of fluid pressure in chamber 26. When the chamber 26 is exhausted, the friction plates 66, 18, 20 and 22 are said to be in their "free running" condition and a free running clearance between adjacent friction surfaces is maintained. The purpose of free running clearance is to reduce frictional drag and thereby improve efficiency when a friction torque transmitting device is not operating.

The free running clearance must be removed before clutch engagement can be achieved. To remove the free running clearance, fluid pressure passes through passage 58 to chamber 56 to cause the take-up piston 50 to move rightward into abutment with pressure plate 20. This will result in axial movement of the other plates toward plate 22 such that the free running clearance is removed. The chamber 56, being small relative to the chamber 26, requires a very short fill time. During the fill period, the apply piston 28 is maintained in its leftward position by the spring 44. Once the free running clearance has been removed, fluid pressure in the chamber 26 will begin increasing rapidly. This increase in pressure will cause slight rightward movement of the apply piston 28.

This slight movement of the apply piston 28 will result in compression of the fluid in chamber 56 and the transmission of a very high apply force to the pressure plate 20. Thus, complete engagement of the friction plates will be achieved with only slight movement of the apply piston 28. The one-way valve 60, as previously stated, prevents the fluid from leaving the chamber 56 such that the high compression pressures necessary for clutch engagement can be achieved with the slight movement of piston 28. When the chamber 26 is exhausted and the spring 44 moves the piston 28 leftward, the fluid in chamber 56 will expand thereby relieving the pressure and permitting the plates 18, 20, 22 and 66 to return to their free running condition.

It is well-known that in rotating clutch housings, centrifugal pressure can be generated which can result in unwanted engagement of the clutch. To prevent the centrifugal pressure generated in chamber 56 from causing the take-up piston 50 to move rightward, a plurality of centrifugal flyweights, such as 68, are provided. These flyweights each have a lever arm 70 which engages a recess 72 formed in the piston 50. As the housing 12 rotates, the centrifugal force of flyweight 68 is transmitted to the piston 50 to counteract any centrifugal pressure which might accumulate in the chamber 56. As the flyweight 68 pivots at its point of contact with the ring 14, the right surface thereof moves away from the plate 20.

It should be apparent to those skilled in the art from the above description that the relatively small chamber 56 will provide rapid take-up of the free running clearance and that only slight movement of the piston 28 will be required to achieve complete engagement since all of the apply forces generated in apply chamber 26 will be transmitted through the fluid trapped in the chamber 56 and the take-up piston 50 to the pressure plate 20.

Also, it should be appreciated that while the above device was primarily described as a clutch, this invention can be appropriately used with multi-plate friction brakes having fluid-operated pistons. Generally, with a friction brake, the housing is stationary such that a centrifugal mechanism would not be needed.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A fluid-operated apply piston for a multi-plate friction torque transmitting mechanism comprising; a fluid cylinder; an apply piston sealingly slidably disposed in said fluid chamber; means for inhibiting free axial movement of said apply piston; a take-up piston slidably disposed in said apply piston; fluid passage means connecting said pistons; and one-way hydraulic fluid reed valve means disposed in said passage means for permitting free flow of hydraulic fluid to said take-up piston and retarding fluid flow therefrom, said take-up piston being axially movable free of said inhibiting means with fluid pressure to engage one of the plates to remove the clearance from between adjacent plates, said apply piston being operable with increasing fluid pressure to provide an apply force to said plates through said take-up piston to fully engage said multi-plate friction torque transmitting mechanism.

2. A fluid-operated apply piston for a multi-plate friction torque transmitting mechanism comprising; a fluid cylinder; an apply piston sealingly slidably disposed in said fluid cylinder; a take-up piston slidably disposed in said apply piston; fluid passage means connecting said pistons; and one-way hydraulic fluid reed valve means disposed in said passage means for permitting free flow of hydraulic fluid to said take-up piston and retarding fluid flow therefrom, said take-up piston being movable with fluid pressure to engage one of the plates to remove the clearance from between adjacent plates, said apply piston being operable with increasing fluid pressure to provide an apply force to said plates through said take-up piston to fully engage said multi-plate friction torque transmitting mechanism; and return spring means directly operable on said apply piston only.

3. A fluid-operated apply piston for a multi-plate friction torque transmitting mechanism comprising; a rotatable housing; a fluid cylinder formed in said housing; an apply piston sealingly slidably disposed in said fluid cylinder; a take-up piston slidably disposed in said apply piston; fluid passage means connecting said pistons; one-way hydraulic fluid valve means disposed in said passage means for permitting free flow of hydraulic fluid to said take-up piston and retarding fluid flow therefrom, said take-up piston being movable with fluid pressure to engage one of the plates to remove the clearance from between adjacent plates, said apply piston being operable with increasing fluid pressure to provide an apply force to said plates through said take-up piston to fully engage said multi-plate friction torque transmitting mechanism; and centrifugal flyweight means disposed in said housing and engaging said take-up piston for counteracting the centrifugal force generated in said fluid cylinder resulting from the rotation of said housing.

* * * * *